Patented Jan. 18, 1949

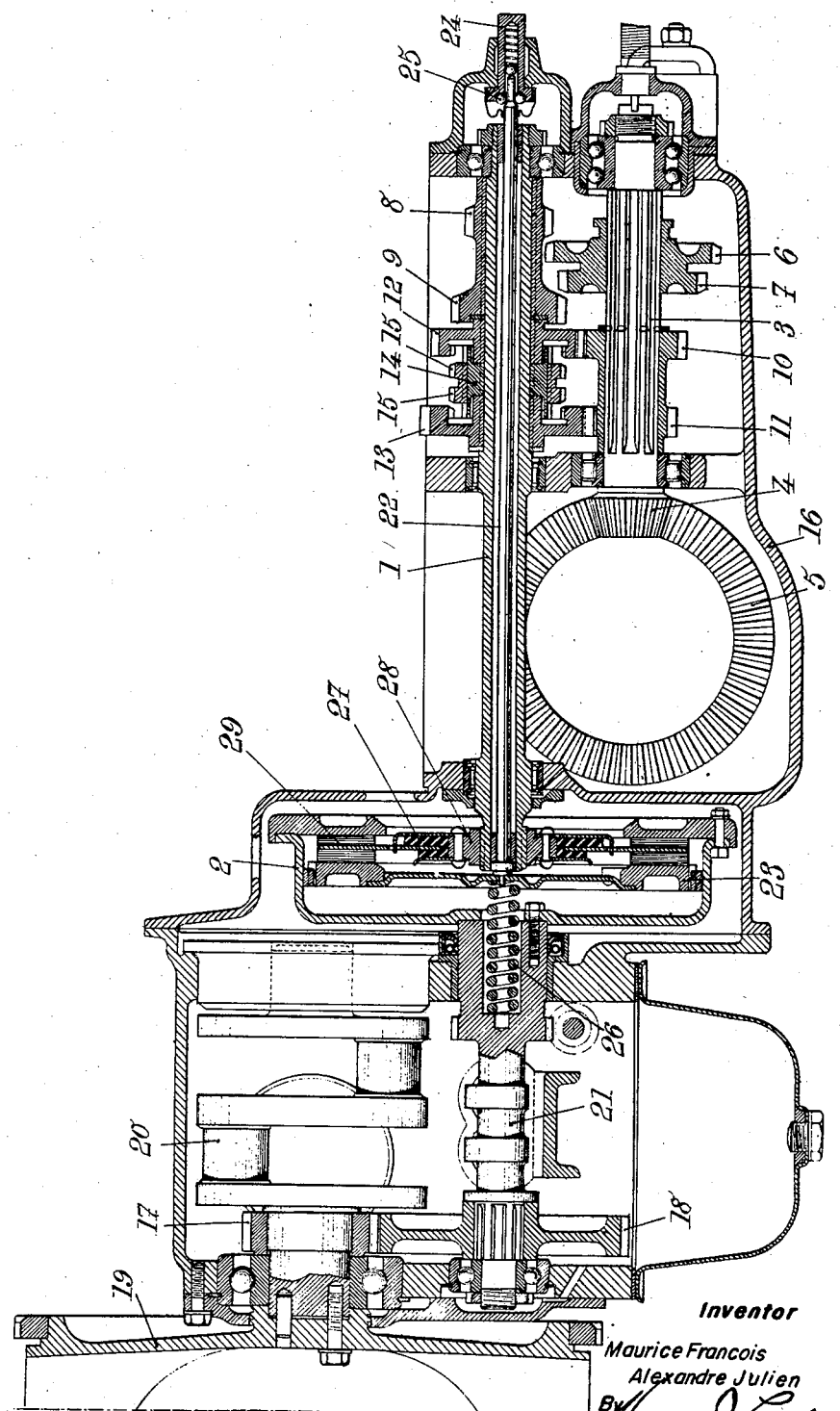

2,459,705

UNITED STATES PATENT OFFICE 2,459,705

TRANSMISSION SYSTEM FOR AUTOMOBILE VEHICLES

Maurice Francois Alexandre Julien, Paris, France

Application March 9, 1945, Serial No. 581,893
In France June 9, 1943

5 Claims. (Cl. 74—326)

Section 1, Public Law 690, August 8, 1946
Patent expires June 9, 1963

The present invention relates to transmission systems of the kind of those used in connection with automobile vehicles, that is to say which include a gear box or change speed gear interposed between the engine and the driven part or member and intended to permit of varying, within a given range, for instance from 1 to $n$ to 1 to 1, the ratio of the respective speeds of the driven part and the driving shaft. But it should be noted that the invention is not limited to its application to automobile vehicles and also extends to all systems of this kind for any plant or machine.

The chief object of the present invention is to permit of reducing the space occupied by such systems, and of simplifying them.

According to an essential feature of the present invention, with this object in view, I interpose, in a system of the kind above mentioned, on the input side (or eventually on the output side) of the change speed gear, a reducing or multiplying gear which permits, for the range of gear ratios that is considered, to distribute the various gear combinations of the gear box into multiplying gear combinations and reducing gear combinations, with a view, for instance, to reducing the maximum diameter of the pinions and, consequently, the space occupied by the change speed gear box.

According to another feature of the present invention, which relates to internal combustion engines, in particular as used in connection with automobile vehicles, I make use, for the transmission of the driving torque of the engine, of the cam-shaft or shaft serving to operate the valve gear (which shaft is, as a rule, driven at a speed different from that of the driving shaft, or crank-shaft, generally one half of this speed), and this cam-shaft may be used for driving the change speed gear, according to the first feature, above mentioned.

According to still another feature of the present invention, which may be used separately from those above set forth, in a system including an internal combustion engine and a change speed gear with a clutch interposed between said engine and said gear, said clutch is controlled through means extending through one of the shafts of the change speed gear, for instance the primary shaft thereof.

Other features of the present invention will result from the following detailed description of a specific embodiment thereof.

A preferred embodiment of the present invention will be hereinafter described, with reference to the accompanying drawings, given merely by way of example, and in which:

The only figure shows, in partial axial section, a power plant for an automobile vehicle, of the kind including a conical differential gear disposed in close vicinity to the clutch (for instance for the direct drive of steerable vehicle wheels), this plant being made according to the present invention.

In the following description, the invention will be described as applied to the case of an automobile vehicle in which it is desired to transmit the driving torque to the shaft by which the differential gear is driven through a change speed gear and with a transmission gear ratio (as above defined) ranging from 1 to $n$ to 1 to 1.

According to the present invention, this system is devised in such manner that said change speed gear, instead of being driven directly by the crank-shaft of the engine, i. e. at the same speed as said shaft, as usual, is driven at a lower speed, obtained by means of any suitable reducing gear.

For instance, in one embodiment of the invention among many others which may be imagined, the primary or input shaft of the change speed gear is driven at a speed equal to one half of the speed of the engine crank-shaft or driving shaft. In this case, and supposing for instance that the lowest transmission ratio of the change speed gear is equal to 1 to 4, the corresponding gear combination of the change speed gear should correspond to a reduction ratio of 1 to 2, while the highest gear combination (which, under normal conditions, corresponds to direct drive) must correspond to a multiplication ratio equal to 2 to 1.

It will be readily understood that, with such an arrangement, the highest and lowest gear ratios of the change speed gear are given values different from the corresponding values in the case of the usual arrangement. As one of these values is greater than 1 and the other lower than 1, in order to obtain a given ratio between them, it is no longer necessary to give the two gear wheels corresponding to the lowest gear such a great difference between their diameters. Therefore the diameter of the largest gear wheel is smaller than in the usual gear box, whereby the space occupied by the whole device is reduced.

Furthermore, it is possible to obtain substantially the same efficiency for the various transformation ratios and to avoid, as it is the case with the usual gear boxes, the necessity of using counter-gear trains turning freely on the primary shaft or the secondary shaft of the gear box or even on a special countershaft.

For instance, on the embodiment illustrated by the drawing, and which corresponds to the case of the conical or bevel gearing of the differential being driven directly by the gear box, said gear box may include the following elements.

a. An input shaft 1 which receives its motion from the engine, at a speed equal to one half of that of the crank-shaft or driving shaft 20, through the medium of a clutch shown at 2;

b. An input shaft 3, which is adapted directly to drive bevel wheel 4 through which gear wheel 3 of the differential gear is driven, said wheel being considered as the driven part of the system; and, c. The pinions intended to transmit motion with different gear ratios from one shaft to the other, according to any suitable arrangement.

The change speed gear shown by way of example by the drawing is supposed to give four different gear ratios.

The first and second are obtained at will by displacing a group of two pinions 6 and 7 adapted to slide on the output shaft 3, so that either 6 is brought into mesh with a pinion 8 keyed on the input shaft 1, or 7 is brought into mesh with another pinion 9, also keyed on said input shaft 1;

The third and fourth gear ratios are obtained through pinions 10, 11, 12 and 13 always in mesh two by two, that is to say 10 with 12 and 11 with 13. One or the other of these combinations is brought into action by means of a sliding clutch element 15—14. This way of controlling the gears can advantageously be used in lieu of the usual synchro-mesh system, which is obviously more complicated. This advantage is due to the fact that the inertia of the clutch means, which has a preponderating effect where gear changing is concerned, is in this case divided by four since the input shaft is rotating at a speed equal to one half of the usual speed.

The whole may, as usual, be housed inside a single casing 16 which, with my arrangement, can be reduced to relatively very small dimensions (owing to the moderate size of the pinions of the change speed gear), as shown by the drawing.

Concerning the means for reducing the speed of revolution between the driving shaft, or crank-shaft of the engine, and the change speed gear, they may be of any suitable conventional or other type. Preferably, as shown by the drawing, the means in question are constituted by gear wheels such as 17 and 18, located close to the fly-wheel 19 of the engine. The crank-shaft of said engine is shown on the drawing at 20.

According to another feature of the present invention, which may, eventually, be used separately, I make use, for transmitting motion from the driving shaft 20 of the internal combustion engine, and the clutch-gearbox unit, of the engine cam-shaft or similar shaft or element intended to control the engine valve-gear, which cam-shaft is generally driven at a speed equal to one half of that of the crank-shaft.

In the drawing, I have shown this arrangement, which is particularly advantageous for practical purposes. As illustrated, the motion of the driving shaft 20 is transmitted to cam-shaft 21, which of course, in this case, is constructed in such manner as to be able to transmit the driving torque. Said cam-shaft 21 is in turn operatively connected with clutch 2, through which the motion passes to the change speed gear and finally to the differential gear illustrated by bevel pinions 4, 5.

Finally, according to still another feature of the present invention, which can also be used separately, the clutch is controlled by operating means extending through one of the shafts of the change speed gear, and, in particular, as illustrated, through the input shaft.

For this purpose, as it can be seen on the drawing, said input shaft 1 is made hollow, so as to leave an axial passage for a rod 22 capable of sliding in said shaft. This rod 22 is fixed, at one of its ends, to one of the plates 23 of the clutch, so as to be able to push it against the action of a spring 26, preferably disposed along the common shaft of rod 22 and cam-shaft 21. Advantageously, the clutch disc 29 is connected to its hub 28 through rubber blocks 27. It is thus possible to disengage the clutch by axially displacing rod 22, this axial movement being for instance transmitted by means of a push-piece 24, with a thrust ball-bearing 25.

Such an arrangement permits of reducing to a minimum the space occupied by the means for controlling the clutch.

Whatever be the specific arrangement that is adopted, I obtain a system the working of which results sufficiently clearly from the preceding description for making it unnecessary to enter into further explanations. This system has, over systems of the same kind as already exists, many advantages among which the following may be cited:

The total space necessitated by the system is much more moderate;

The forces brought into play when changing from one gear to another have been considerably reduced;

The construction of the whole is greatly simplified.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

In order to avoid any misunderstanding as to the meaning of the terms used in these claims (same as in the above description), what I call the gear ratio of a transmission from a driving shaft to a driven part is the ratio of the speed of the driven part to the speed of the driving shaft.

Likewise, what I call the gear ratio of a change speed gear, or gear box, is the ratio of the speed of the output shaft of said change speed gear to the speed of the input shaft thereof.

What I claim is:

1. In a system including a driving shaft and a driven part, a change speed transmission for transmitting the movement from the first of said shafts to the other with at least two different gear ratios the higher of which is at most equal to 1 to 1, this transmission comprising, in combination, a change speed gear of the type including an input shaft and an output shaft having their axes at a distance from each other, with gears carried by said shafts for directly interconnecting them, said change speed gear being constructed to give at least two different gear ratios one of which is higher than 1 to 1 and the other at most equal to 1 to 1, reducing gear means for coupling the input shaft of said change speed gear with said driving shaft and means for coupling the output shaft of said gear with said driven part, the gear ratio of said reducing gear means and the two gear ratios of said change speed gear being so chosen that the products of the first by the other two, respectively, are equal to the two gear ratios to be obtained for the whole change speed transmission system.

2. In a motor plant including an internal combustion engine with its crank-shaft, and a driven part intended to receive motion from said crank-shaft with at least two different transmission gear ratios the higher of which is at most equal to 1 to 1, the combination of a change speed gear of the type including an input shaft and an output shaft having their axes at a distance from each other, with gears carried by said shafts for directly interconnecting them, said change speed gear being constructed to give at least two different gear ratios, one higher than 1 to 1 and the other at most equal to 1 to 1, an intermediate shaft coupled with the input shaft of said change speed gear, reducing gear means between said crank-shaft and said intermediate shaft, the gear ratio of said reducing gear means and the two gear ratios of said change speed gear being so chosen that the products of the first by the other two, respectively, are equal to the two transmission gear ratios to be obtained between said crank-shaft and said driven shaft, and means for coupling said driven part with the output shaft of said change speed gear.

3. In a motor plant including an internal combustion engine, with its crank-shaft, and a driven part intended to receive motion from said crank-shaft with at least two different transmission gear ratios the higher of which is at most equal to 1 to 1, the combination of a change speed gear of the type including an input shaft and an output shaft having their axes at a distance from each other, with gears carried by said shafts for directly interconnecting them, said change speed gear being constructed to give at least two different gear ratios one of which is higher than 1 to 1 and the other at most equal to 1 to 1, an intermediate shaft provided in said internal combustion engine, reducing gear means between said crank-shaft and said intermediate shaft, clutch means for coupling said intermediate shaft with the input shaft of said change speed gear, the gear ratio of said reducing gear means and the two gear ratios of said change speed gear being so chosen that the products of the first by the other two, respectively, are equal to the two transmission gear ratios to be obtained between said crank-shaft and said driven part, and means for coupling said driven shaft with the output shaft of said change speed gear.

4. A motor plant which comprises, in combination an internal combustion engine including a crank-shaft and a cam-shaft driven at a reduced speed by said crank-shaft, a driven part intended to receive motion from said crank-shaft with at least two different gear ratios the higher of which is at most equal to 1 to 1, a change speed gear of the type including an input shaft and an output shaft having their axes at a distance from each other, with gears carried by said shafts for directly interconnecting them, said change speed gear being constructed to give at least two different gear ratios, one higher than 1 to 1 and the other at most equal to 1 to 1, means for operatively connecting said input shaft with said cam-shaft, and means for operatively connecting said driven part with said output shaft, the two gear ratios of said change speed gear being so chosen that their respective products by the gear ratio of reduction between said crank-shaft and said cam-shaft are equal to the two gear ratios to be obtained between said crank-shaft and said driven part.

5. A motor plant unit which comprises, in combination, an internal combustion engine including a crank-shaft and a cam-shaft driven at a reduced speed by said crank-shaft, a driven part intended to receive motion from said crank-shaft with at least two different gear ratios the higher of which is at most equal to 1 to 1, a change speed gear of the type including an input shaft and an output shaft having their axes at a distance from each other, with gears carried by said shafts for directly interconnecting them, said change speed gear being constructed to give at least two different gear ratios, one higher than 1 to 1 and the other at most equal to 1 to 1, clutch means for coupling said input shaft with said cam-shaft, and means for operatively connecting said driven part with said output shaft, the two gear ratios of said change speed gear being so chosen that their respective products by the gear ratio of reduction between said crank-shaft and said cam-shaft are equal to the two gear ratios to be obtained between said crank-shaft and said driven part.

MAURICE FRANCOIS ALEXANDRE JULIEN.

REFERENCES CITED

The following references are of record in the file of this patent:

UNITED STATES PATENTS

| Number | Name | Date |
|---|---|---|
| 1,552,169 | Kenen | Sept. 1, 1925 |
| 1,876,249 | Drenzke | Sept. 6, 1932 |
| 2,000,605 | Moorhouse | May 7, 1935 |
| 2,038,326 | Wagner | Apr. 21, 1936 |
| 2,105,742 | Lee | Jan. 18, 1938 |
| 2,118,811 | Fageol | May 31, 1938 |
| 2,195,479 | Buchner | Apr. 2, 1940 |
| 2,341,756 | Avila | Feb. 15, 1944 |